United States Patent [19]
Schaffer

[11] Patent Number: 5,467,644
[45] Date of Patent: Nov. 21, 1995

[54] UNIVERSAL TRANSMISSION TESTER

[76] Inventor: Larry Schaffer, 7204 Centerhill Dr., Lakeland, Fla. 33809

[21] Appl. No.: 51,977

[22] Filed: Apr. 26, 1993

[51] Int. Cl.⁶ .................................................. G01M 19/00
[52] U.S. Cl. ............................................................ 73/118.1
[58] Field of Search .................................... 73/118.1, 116, 73/117.2; 364/579, 580

[56] References Cited

U.S. PATENT DOCUMENTS 5,060,177  10/1991  Gregory et al. ...................... 73/118.1

Primary Examiner—Richard Chilcot
Assistant Examiner—William L. Oen
Attorney, Agent, or Firm—George A. Bode; D. Neil LaHaye

[57] ABSTRACT

A device for selectively controlling the solenoids in a computer controlled transmission for testing the transmission. Circuitry for providing electrical power to the device may be adapted to be plugged into the cigarette lighter in the automobile. A pin connector adapted to different makes of transmissions is connected to the electrical connector of the transmission to be tested. Four (4) two-pole, six position rotary switches are provided for selectively activating the transmission solenoids and shifting the transmission into a selected gear. Indicator lamps are provided to indicate the selected gear in which the transmission should be. A single pole rotary switch is provided for selectively controlling the pressure in the transmission being tested. Two momentary switches are provided for controlling the torque converter clutch solenoids in the transmission. Only one of the four shift switches is used at any time depending on the make of transmission being tested. This makes the device universal as to the different makes of computer controlled transmissions.

8 Claims, 5 Drawing Sheets

UNIVERSAL TRANSMISSION TESTER

BACKGROUND OF THE INVENTION

1. Field of the Invention

The present invention relates to transmission testing devices and, particularly, to a universal device for manually controlling the operation of solenoids within computer shifted transmissions.

2. General Background

Automatic transmissions in recent vehicles are electronically controlled. Electronic sensors monitor engine conditions and determine the proper transmission gear. The system transmits an electronic signal through a wiring harness to the electronic control module (ECM) of the transmission. The signal activates one of several solenoids to cause the transmission to change to the determined gear. The signal for each specific gear is normally related to a combination of grounded and ungrounded wires in the wiring harness. Since there are many automobile manufacturers, not every transmission responds alike to the same set of signals. As a result, there are transmission test devices for each type of transmission. This leads to the need for mechanics that work on different types of vehicles to have a number of expensive test devices. Transmission related testing devices that the inventor is aware of include the following.

U.S. Pat. Nos. 3,273,384 and No. 3,302,107 are directed to hydraulics and individual component applications and testing and are not related to the electronic transmission controls of today's vehicles.

U.S. Pat. No. 3,482,441 is directed to an accurate and precise method of measuring the quality and time length of a transmission shift. It only measures shifting and does not control it.

U.S. Pat. No. 4,809,541 is directed to testing speed control (cruise control) systems and not automatic transmissions.

U.S. Pat. No. 4,998,437 is directed to limited disassembly of a transmission hydraulic system to hydraulically operate a unit and does not deal with the electrical shifting controls of a transmission.

U.S. Pat. No. 5,060,177 is directed to testing only a specific CHRYSLER™ transmission by simulating shifting conditions just as the onboard computer might do and is very complex in operation.

U.K. Patent Application GB 2 019 585A is directed to reading and checking electrical circuits within the transmissions of commercial applications and not to passenger automobiles.

The known test devices do not address the need for a universal test device capable of testing the transmissions of different manufacturers.

SUMMARY OF THE INVENTION

The present invention addresses the above need in a straightforward manner. What is provided is a single unit that is capable of testing the transmissions of different manufacturers. The unit energizes a number of two-pole solenoids that work in combination to transmission shifting through the full range of gears. Power to the unit may be supplied to the unit by plugging in to a 12-volt power source in the vehicle such as the cigarette lighter. A wiring harness is plugged into the connector of the transmission after the automobile computer is disconnected from the connector. Four (4) shift selector switches, each of which is a two-pole switch, are provided for shifting transmissions being tested. The switch selector used is dependent on the type of transmission to which the unit is connected. Position marks are provided on the unit for each switch to indicate the switch position. A series of indicator lights on the unit are used to confirm that the test unit is operating properly. The test unit includes switches to provide positive current or a ground to the transmission torque converter clutch (TCC). The test unit also includes circuitry for selectively controlling the pressure in transmissions that include such a feature.

BRIEF DESCRIPTION OF THE DRAWINGS

For a further understanding of the invention, reference should be had to the following description, taken in conjunction with the accompanying drawings in which like parts are given like reference numerals and, wherein.

DETAILED DESCRIPTION OF THE PREFERRED EMBODIMENT

Figure 8:
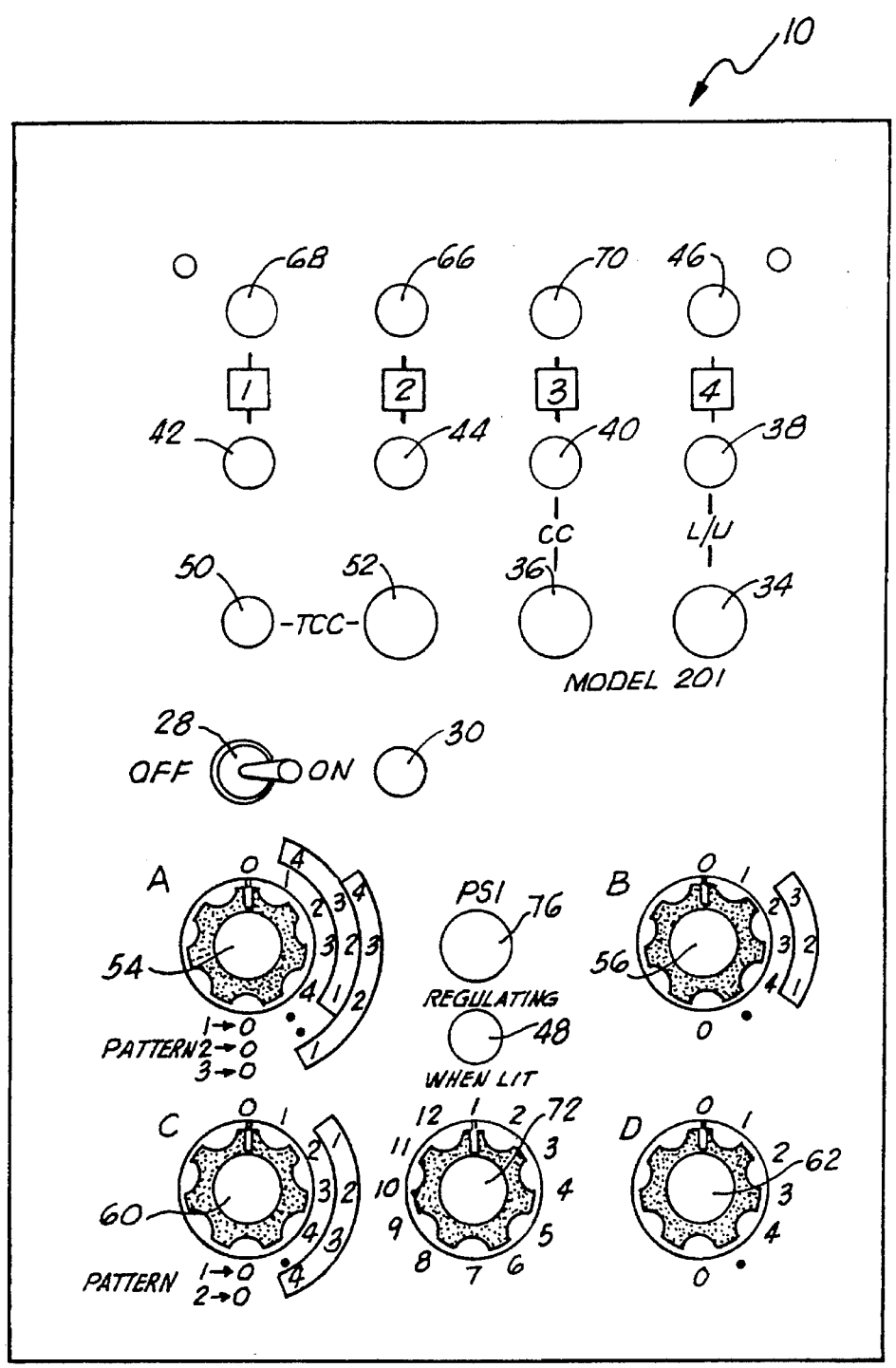

For ease of illustration and description, the circuitry of the invention is broken down into several drawing figures and the invention and its control face is generally indicated by the numeral 10 in FIG. 8. Automatic transmission test device 10 is generally comprised of circuitry 12 for supplying power, circuitry 14 for electrically connecting the invention to the connector of a transmission, circuitry 16 for selectively shifting the transmission being tested, circuitry 18 for indicating the selected gear in which the transmission should be, circuitry 20 for controlling the pressure in the transmission, and circuitry 22 for grounding selected solenoids in the transmission.

Figure 1:
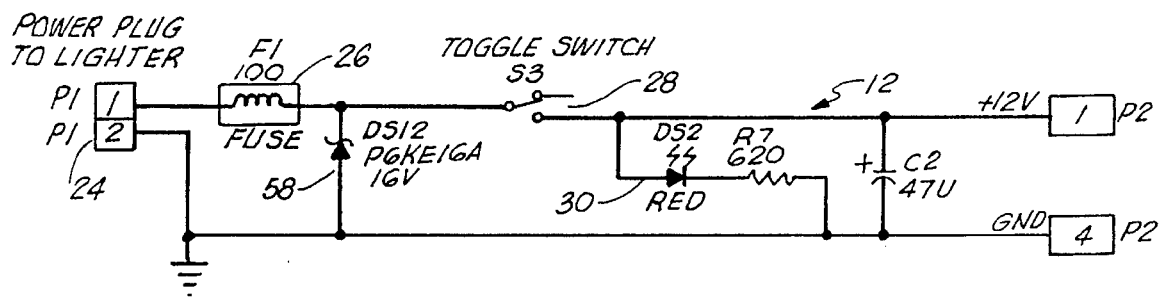
FIG. 1 illustrates the circuitry for providing power and turning the preferred embodiment of the present invention on or off.

Referring to the drawings, FIG. 1 illustrates the circuitry 12 for supplying power to and switching the preferred embodiment of the present invention on and off. Power connection 24 is preferably adapted to be received in the cigarette lighter of automobiles so that it is not necessary to carry a power source with the invention. A negative ground is used and fuse 26 protects the invention from power surges. Toggle switch 28 is provided for turning the invention on and off. Indicator light 30, which may be any suitable light source such as an incandescent bulb or a light emitting diode, lights when the invention is turned on to indicate that it is receiving power. Diode 58 is provided to protect the unit from voltage surges.

Figure 2:
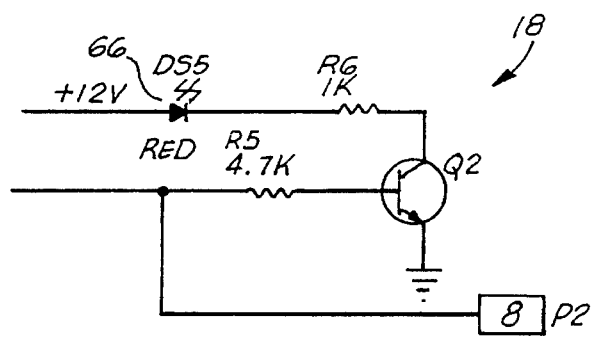
FIG. 2 illustrates the circuitry for one of the red indicator lights of the unit.
Figure 5:
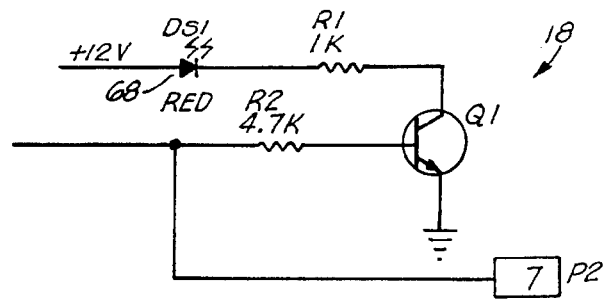
FIG. 5 illustrates the circuitry for one of the red indicator lights of the unit.
Figure 7:
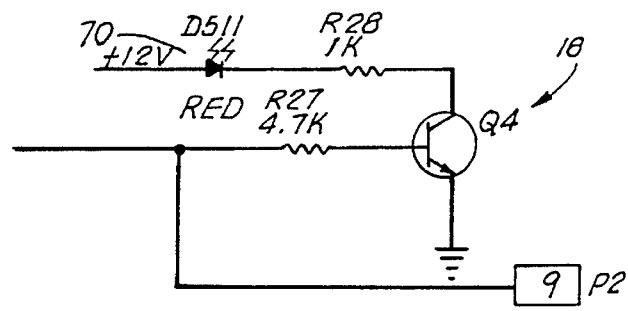
FIG. 7 illustrates the circuitry for one of the red indicator lights of the invention; and, FIG. 8 illustrates the face or panel of the invention.
Figure 3:
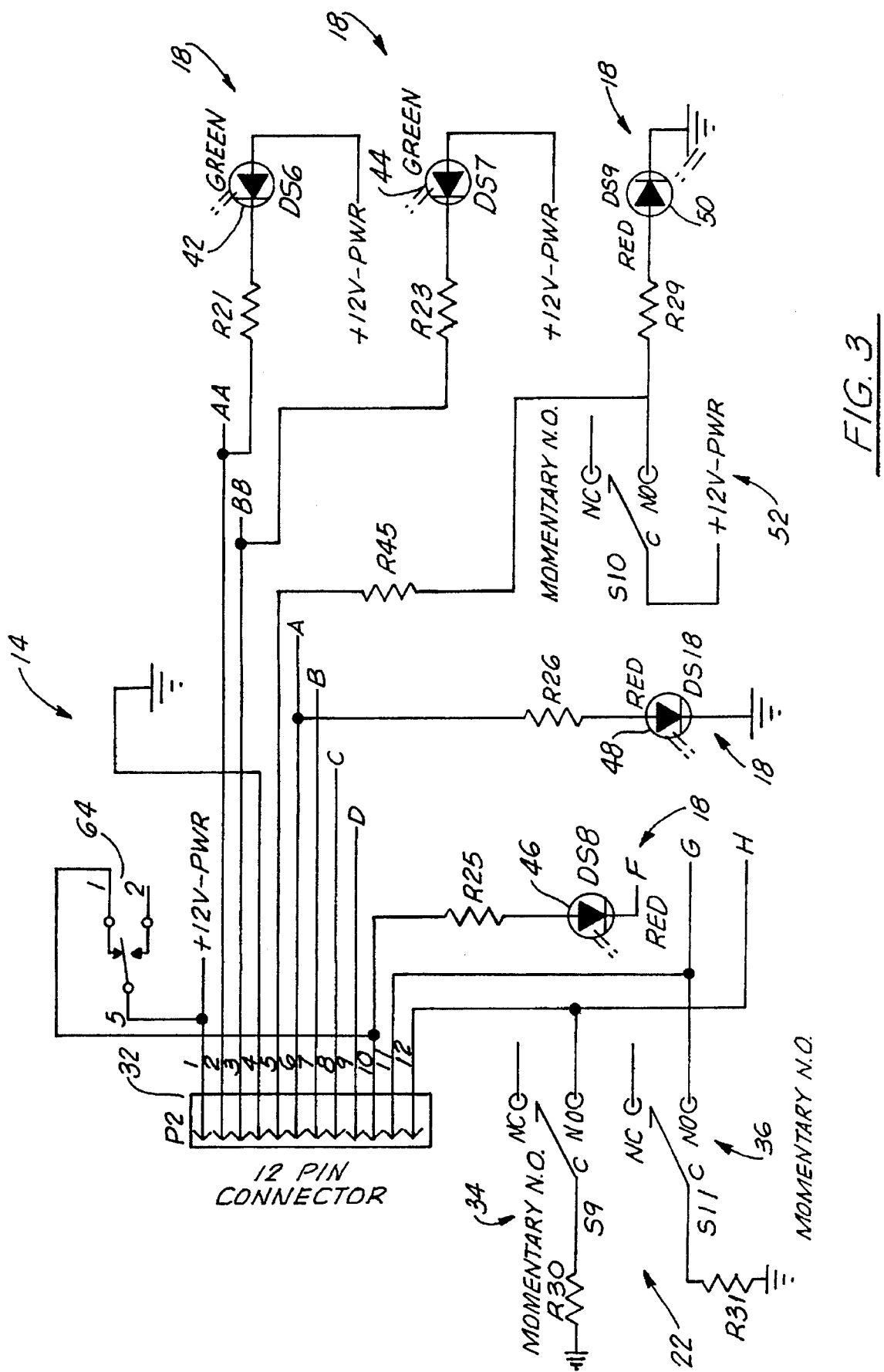
FIG. 3 illustrates the circuitry for the unit wiring harness that eventually ends at the connector of the transmission.
Figure 4:
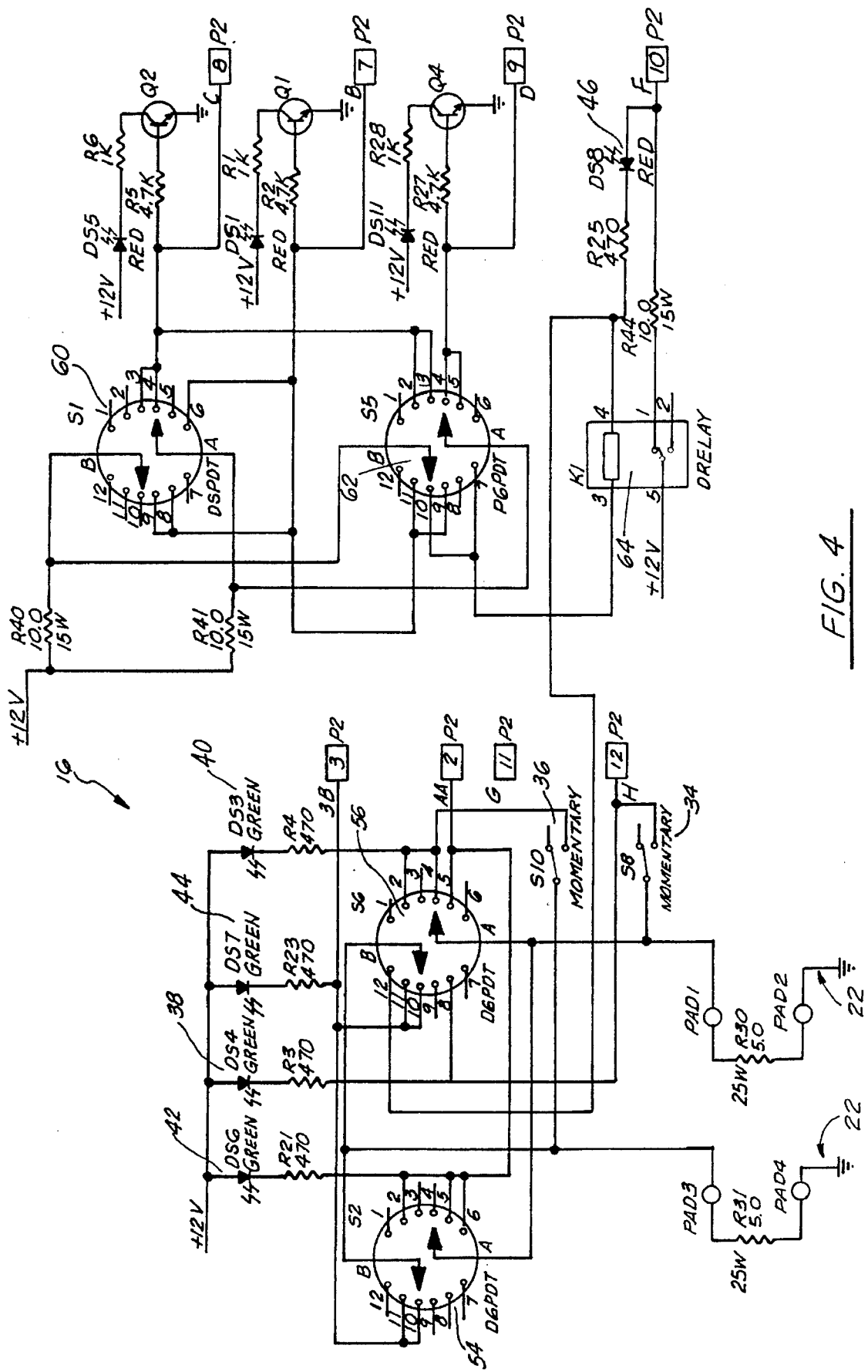
FIG. 4 illustrates the circuitry of the four (4) shift selector switches.

FIG. 3 illustrates the circuitry 14 for electrically connecting the invention to the connector of the transmission being tested. Twelve-pin connector 32 is illustrated schematically since it may be attached to adaptors not shown to allow connection to a variety of automobile transmissions. FIG. 3 also illustrates means 22 for grounding selected solenoids in the transmission being tested. Means 22 is comprised of momentary switches 34 and 36. Green indicator lights 38 and 40, seen in FIG. 4, respectively indicate when switches 34 and 36 are on. The connection is indicated by wires H and G respectively. The operation of green indicator lights 42 and 44 and red indicator light 46 are related to the position of shift means 16 in FIG. 4 and will be discussed further below. Red indicator light 48 is lit when power is supplied to pressure control means 20 and will be discussed below. Red indicator light 50 is lit when momentary switch 52 is on. Momentary switch 52 is used to provide positive current to the torque converter clutch solenoid through resistor R45. This is indicated by red indicator light 50. Wires 2, 3, 11, and 12 (FIG. 3) are respectively connected to green indicator lights 42, 44, 40, and 38 (FIG. 4) which will light when these respective wires are grounded. The wires are connected through twelve-pin connector 32 to the transmission solenoid ground wire (negative) and, therefore, control solenoid operation. Wire number 1 provides positive current to the transmission solenoids from the invention's main power switch. Wires 11 and 12 respectively have grounded switches 36 and 34 wired to them to allow the operator to manually ground the transmission solenoids connected to them through twelve-pin connector 32. If any positive current controlled solenoids in the transmission are not self-grounded, then a ground is provided with wire number 4. Some automatic transmissions have three shift solenoids activated at once, which can not be provided for with a two-pole switch. Wire 10 in twelve-pin connector 32 is provided for this purpose and is "hot" (has positive current) at all times that the N/C (normally closed) contacts of relay 64 are closed. Relay 64 can only be activated (contacts opened) if the normally unused (5 O'clock) position of shift selector 56 is selected (FIG. 4). This provides a ground for relay 64 as well as for red indicator lamp 46 for wire 10 on twelve-pin connector 32 which indicates that positive current is on. Positive current is then supplied to the relay at the "Off" (12 O'clock position) and number 3 position of shift selector 62. This means that relay 64 turns off the current to number 10 wire in these two positions. Wires 7, 8, and 9 each have a 2N3904 transistor's base lead connected to them through a 4.7K resistor (seen in FIG. 2, 5 and 7). These transistors control red indicator lights 66, 68, and 70 (preferably LED's) so that they light to indicate when positive current is on at their respective wires. This allows lights 66, 68, and 70 to light when as little as one-volt is present at the wire. Wire number 5 is used when a positive current source is needed to activate a torque converter clutch solenoid.

FIG. 4 illustrates the circuitry 16 for selectively shifting the transmission being tested. Circuitry 16 is comprised of four (4) shift selectors 54, 56, 60, and 62, also indicated A–D, respectively, in FIG. 8. Each shift selector is a non-shorting, two-pole, six-position rotary switch. Shift selector 54 has both poles grounded through resistors R30 and R31 and in various positions will ground wires numbered 2 and 3 in predetermined sequence. Shift selector 56 has both poles grounded through resistors R30 and R31 and, in proper sequence, will ground wires numbered 2 and 3 and wires numbered 11 and 12. Shift selectors 60 and 62 have both poles connected to a positive current source through resistors R40 and R41. Selector 60 provides positive current to any transmission solenoids connected to wires 7 and 8. Selector 62 provides positive current to wires 7,8, and 9.

Figure 6:
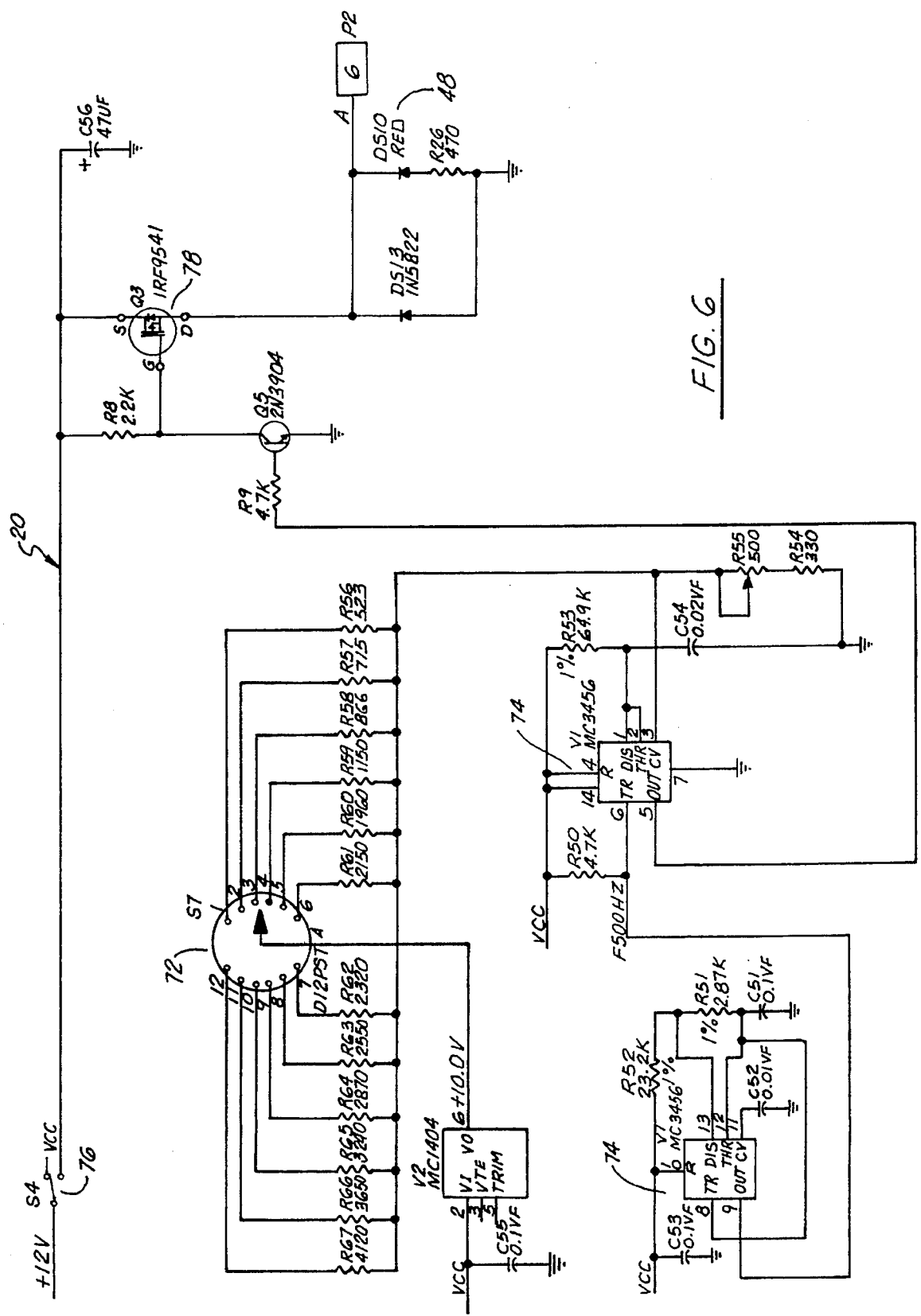
FIG. 6 illustrates the circuitry for the transmission pressure control switch.

FIG. 6 illustrates the circuitry 20 for controlling pressure in the transmission being tested. Pressure selector switch 72 is a single pole, 12-position rotary switch that receives ten (10) volts positive current from the voltage regulator U-2. Rotating switch 72 clockwise through the positions indicated in FIG. 8 provides twelve (12) different voltage levels to regulate pulse generator 74. Pulse generator 74 is comprised of a basic 556 IC timer and uses resistor and capacitor valves to achieve a variable range of duty cycles. The signal from pulse generator 74 is sent through transistor Q5 to MOSFET 78 that is designed to handle at least fifteen (15) amperes. MOSFET 78 delivers positive current provided from pressure selector switch 76 to wire number 6 in connector 32 and thereby regulates the transmission pressure solenoid.

In operation, the choice of using any of shift selectors 54, 56, 60, or 62 makes device 10 universal for controlling the operation of solenoids within computer shifted transmissions in automobiles from different manufacturers. Since describing the test procedures for all transmissions that device 10 is applicable to is prohibitive, a description of the procedure for testing the Ford AXOD-E transmission will be provided below to serve as an example of the operation of device 10. The engine computer is disconnected from the transmission connector and twelve-pin connector 32 is plugged into an adaptor harness, which plugs into the transmission connectors. Power connection 24 is connected to a suitable 12-volt power source such as the cigarette lighter in the automobile. Power switch 28 is pushed to provide power to device 10. Red lamp 30 should light when switch 28 is turned on to indicate that device 10 has positive current. Shift selector 62 is used to control the operation of the solenoids in the transmission. Positions 1–4 correspond to gears 1–4 in the transmission. In position 1, red lights 68 and 70 should be off and red light 66 should be on. This indicates that device 10 is operating properly and that the transmission should be in first gear. In position 2, red lights 68 and 66 should be on and red light 70 should be off. This indicates that the transmission should be in second gear. In position 3, red lights 68 and 66 should be off and red light 70 should be on. This indicates that the transmission should be in third gear. In position 4, red lights 68 and 70 should be on and red light 66 should be off. This indicates that the transmission should be in fourth gear. Red light 68 indicates when shift solenoid number one should be on. Red light 66 indicates when shift solenoid number two should be on. Red light 70 indicates when shift solenoid number three should be on. If the transmission is not in the gear indicated, then a problem with the shift solenoid or transmission itself is indicated. Depressing switch 76 turns on red light 48 and indicates that pressure selector switch 72 is ready to regulate pressure in the transmission. As indicated above, the #1 (12 O'clock) position is for minimum pressure. Each position provides control for a different pressure in the transmission. As an example, position one should cause approximately 50 psi pressure in the transmission. Red light 50 should light when depressing momentary switch 52. Depressing this switch activates the torque converter clutch.

Device 10 may also be used to control the solenoids of a computer controlled transmission when the transmission is out of the automobile and can not be operated by the engine computer, such as when the transmission is on a dynamometer.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A device for selectively testing a computer-controlled transmission that has an interface connector module and a plurality of solenoids that control a torque converter clutch therein, comprising:

(a) circuitry for providing electrical power to said device;

(b) an interface connector module having multiple pin connectors for connecting said device to said interface connector module of the computer-controlled transmission to be tested;

(c) a plurality of two-pole, six-position rotary switches for selectively shifting the transmission to be tested to one of the transmission gears;

(d) indicator means electrically connected to and activated by said rotary switches for indicating the selected transmission gear;

(e) circuitry enabled by said rotary switches to provide ground connection input to said transmission to energize at least one of the plurality of solenoids that control said torque converter clutch;

(f) means connected through said interface connector modules for selectively controlling the pressure in said transmission being tested; and, (g) means for limiting the current to said solenoids.

2. The device of claim 1, wherein four (4) of said switches are provided for shifting said transmission.

3. The device of claim 1, wherein said pressure control means comprises a single pole rotary switch.

4. The device of claim 1, wherein said circuitry for energizing at least one of the solenoids comprises two momentary switches.

5. A device for selectively a testing computer-controlled transmission that has an interface connector module and a plurality of solenoids that control a torque converter clutch therein, comprising:

(a) circuitry for providing electrical power to said device;

(b) an interface connector module having multiple pin connectors for connecting said device to said interface connector module of the computer-controlled transmission to be tested;

(c) four (4) two-pole, six position rotary switches for selectively shifting said transmission to be tested to one of the transmission gears;

(d) indicator means electrically connected to and activated by said rotary switches for indicating the selected gear;

(e) circuitry enabled by said rotary switches to provide ground connection input to said transmission to energize at least one of the plurality of solenoids that control said torque converter clutch;

(f) a single pole switch for selectively controlling the pressure in said transmission being tested; and, (g) means for limiting the current to said solenoids.

6. The device of claim 5, wherein said circuitry for controlling torque converter clutch solenoids comprises two momentary switches.

7. The device of claim 5, wherein two (2) of said rotary position switches for shifting the transmission have both poles grounded and the remaining two switches have both poles connected to a positive current source.

8. A device for selectively a testing computer-controlled transmission that has an interface connector module and a plurality of solenoids that control a torque converter clutch therein, comprising:

(a) circuitry for providing electrical power to said device;

(b) an interface connector module having multiple pin connectors for connecting said device to said interface connector module of the computer-controlled transmission to be tested;

(c) four (4) two-pole, six position rotary switches for selectively shifting said transmission to be tested to one of the transmission gears, two of said rotary position switches having poles grounded and the other two of said switches having both poles connected to a positive current source;

(d) indicator means electrically connected to and activated by said rotary switches for indicating the selected gear;

(e) circuitry enabled by one of said rotary switches to provide ground connection input to said transmission to energize at least one of the plurality of solenoids that control a torque converter clutch;

(f) a single pole rotary switch connected through said interface connector modules for selectively controlling the pressure in said transmission being tested; and, (g) means for limiting the current to said solenoids.

* * * * *